United States Patent [19]

Kobori et al.

[11] Patent Number: 5,254,644
[45] Date of Patent: Oct. 19, 1993

[54] SILICONE SELF-ADHESIVE COMPOSITION

[75] Inventors: Takahide Kobori; Isamu Moriizumi; Mitsuhiro Takarada; Kenichi Isobe, all of Annaka, Japan

[73] Assignee: Shin-Etsu Chemical Co., Ltd., Tokyo, Japan

[21] Appl. No.: 880,258

[22] Filed: May 8, 1992

[30] Foreign Application Priority Data

May 9, 1991 [JP] Japan .................................. 3-133643

[51] Int. Cl.$^5$ ............................................ C08F 283/12
[52] U.S. Cl. ................................... 525/478; 525/477; 528/15; 528/31; 528/32
[58] Field of Search .................. 525/478, 477; 528/15, 528/31, 32

[56] References Cited

U.S. PATENT DOCUMENTS

| | | | |
|---|---|---|---|
| 3,884,866 | 5/1975 | Jeram et al. | 524/703 |
| 4,766,170 | 8/1988 | Honma et al. | 524/400 |
| 5,082,886 | 1/1992 | Jeram et al. | 524/403 |
| 5,110,882 | 5/1992 | Hamada et al. | 525/478 |
| 5,169,727 | 12/1992 | Boardman | 525/477 |

FOREIGN PATENT DOCUMENTS 54-37907 11/1979 Japan .
63-22886 1/1988 Japan .

OTHER PUBLICATIONS

English Language Abstract of Japan 63-22886.

Primary Examiner—John C. Bleutge
Assistant Examiner—Margaret W. Glass
Attorney, Agent, or Firm—Millen, White, Zelano & Branigan

[57] ABSTRACT

A silicone self-adhesive composition is comprised of (A) high viscosity organopolysiloxane raw rubber, (B) MQ resin, (C) organohydrogenpolysiloxane, (D) platinum catalyst, and (E) high vinyl content organopolysiloxane. It cures at relatively low temperature into an adhesive layer which has good adhesive properties and heat resistance, finding use as heat resistant adhesive tapes and labels.

11 Claims, No Drawings

SILICONE SELF-ADHESIVE COMPOSITION

This invention relates to a silicone self-adhesive composition having improved self-adhesive properties, curing to heat resistant layers and thus finding use in the manufacture of heat resistant adhesive tapes and labels.

BACKGROUND OF THE INVENTION

Among prior art well-known silicone self-adhesive compositions is a composition comprising a condensate between a polysiloxane having $(CH_3)_3SiO_{\frac{1}{2}}$ and $SiO_2$ units and a dimethyl-silicone raw rubber. This self-adhesive composition is crosslinked with peroxides for the purpose of enhancing adhesive force and cohesive force whereas the curing temperature is as high as 180° to 200° C. There is a need for low-temperature curable silicone self-adhesive compositions from the standpoints of energy cost, productivity and application to substrates having a low heat distortion temperature.

Japanese Patent Publication No. 37907/1979 proposes a low-temperature curable silicone self-adhesive composition utilizing addition reaction between an alkenyl group-containing organopolysiloxane having a viscosity of 200 to 1,000 poise and a SiH-containing organopolysiloxane. This self-adhesive composition, however, is difficult to form a layer having good physical properties and consistent adhesive force on substrates. To obviate these drawbacks, Japanese Patent Application Kokai No. 22886/1088 proposes a silicone self-adhesive composition utilizing addition reaction between an alkenyl group-containing organopolysiloxane having a viscosity of at least 500,000 centipoise (raw rubber) and an SiH-containing organopolysiloxane. The composition is alleged to show satisfactory, consistent adhesive force. However, when exposed to elevated temperatures beyond 200° C. for an extended time, this self-adhesive composition gives rise to the problems of foaming from the raw rubber triggered by cracking, a limited adhesive area, and a noticeable loss of adhesive force, with the additional drawback of a product value lowering due to deteriorated appearance. The composition is not suitable for heat resistant adhesive tapes, labels and other applications where it should withstand elevated temperatures for a long time.

Therefore, an object of the present invention is to provide a silicone self-adhesive composition which not only meets the general demand for brief curing at low temperatures, but also forms a heat resistant silicone adhesive layer which has excellent adhesive properties and undergoes no foaming even after long-term exposure to elevated temperatures.

SUMMARY OF THE INVENTION

According to the present invention, there is provided a silicone self-adhesive composition comprising (A) at least one organopolysiloxane selected from organopolysiloxanes of the following general formulae (1) and (2):

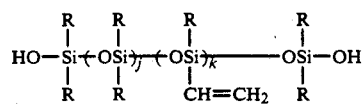

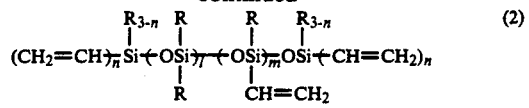

wherein R is a monovalent hydrocarbon group excluding alkenyl, letter n is an integer of from 0 to 3, k and m each are 0 or a positive integer, with the proviso that m is an integer of at least 2 when n is 0, and j and l each are an integer of at least 2,000, (B) an organopolysiloxane comprising $R_3{}^1SiO_{\frac{1}{2}}$ and $SiO_2$ units wherein $R^1$ is a monovalent hydrocarbon group or a hydroxyl group, the molar ratio of $R_3{}^1SiO_{\frac{1}{2}}$ unit to $SiO_2$ unit being in the range of from 0.5 to 1.2, (C) an organohydrogenpolysiloxane containing at least two hydrogen atoms attached to silicon atoms in a molecule, and (D) a platinum catalyst.

The composition further includes (E) an organopolysiloxane of the following general formula (3):

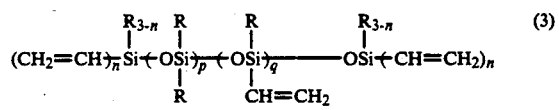

wherein R and n are as defined above, p is an integer of from 0 to 1,000, q is an integer of from 10 to 1,000, and $0 \leq p/q \leq 1$.

In general, the use of a high viscosity raw rubber like component (A) in a silicone self-adhesive composition is, on one hand, effective for stabilizing and improving the adhesive force thereof. On the other hand, exposure to 200° C. of higher temperatures for a long time causes the raw rubber to be thermally cracked into dimethyl cyclics which escape in gas form from the adhesive layer which is, in turn, foamed or expanded, resulting in a noticeable drop of adhesive force. Addition of component (E), high vinyl content organopolysiloxane is effective for preventing cracking of the silicone raw rubber upon heating, so that the composition may cure and crosslink to provide an appropriate close polymer network without foaming.

Since component (E), high vinyl content organopolysiloxane participates in crosslinking, it is possible to use a dimethylsilicone raw rubber terminated with silanol at either end as component (A) rather than a vinyl-containing raw rubber. Then if a vinyl-containing raw rubber base system is relatively short of adhesive force, the system can be improved in adhesive force by adding thereto a dimethylsilicone raw rubber terminated with silanol at either end. The silicone self-adhesive composition of the invention can be cured at low temperatures because it is of the addition curing type.

The silicone self-adhesive composition of the invention cures at low temperatures of about 100° to 150° C. into a silicone adhesive layer which has improved adhesive properties including adhesive force, tack and cohesive force and undergoes little or no foaming and little or no loss of adhesive force even when exposed to 250° C. or higher temperatures. Therefore, the composition is well suited for such applications as heat resistant adhesive tapes and labels.

DETAILED DESCRIPTION OF THE INVENTION

As mentioned above, the silicone self-adhesive composition of the present invention is defined as comprising (A) a high viscosity organopolysiloxane raw rubber, (B) an organopolysiloxane comprising $R_3^1SiO_{\frac{1}{2}}$ and $SiO_2$ units (MQ resin) for imparting adhesiveness after curing, (C) an organohydrogenpolysiloxane, (D) a platinum catalyst, and (E) a high vinyl content organopolysiloxane (silicone oil).

Component (A) or organopolysiloxane is a major component of the silicone self-adhesive composition of the invention. It is at least one organopolysiloxane selected from organopolysiloxanes of the following general formulae (1) and (2).

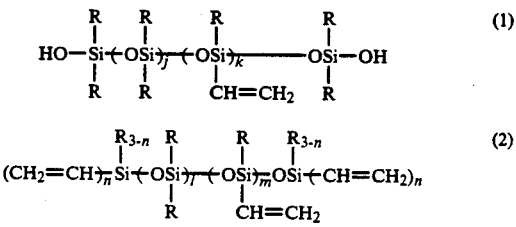

In formulae (1) and (2), R is a monovalent hydrocarbon group having 1 to 12 carbon atoms excluding alkenyl, for example, an alkyl group such as methyl, ethyl, propyl, and butyl; an aryl group such as phenyl and tolyl; an aralkyl group such as benzyl and phenethyl; and a haloalkyl group such as chloropropyl and trifluoropropyl, with the methyl and phenyl groups being preferred from a commercial aspect.

Letter n is an integer of from 0 to 3, and k and m each are 0 or a positive integer. Since component (A) cures through addition reaction with component (C) or organohydrogenpolysiloxane together with component (E), it is possible to use an organopolysiloxane of formula (1) wherein k=0, that is, a vinyl-free, both hydroxyl-terminated dimethylpolysiloxane as a sole component (A). However, the organopolysiloxanes preferred as component (A) are organopolysiloxanes having vinyl groups at both ends or a side chain. Accordingly, it is preferred that in formula (1), k is an integer of at least 1, preferably 1 to 20, especially from 2 to 20. In formula (2), m is an integer of at least 2, especially from 2 to 20 when n is 0. Preferably, in formula (2), n is 1, 2 or 3 and m is an integer of from 0 to 1,000, especially from 0 to 20.

Letters j and l in formulae (1) and (2) represent the length of a siloxane chain are integers of at least 2,000, preferably from 2,000 to 100,000. If j and l are less than 2,000, adhesive properties are too low to achieve the objects of the invention.

Component (A) should preferably have a viscosity of at least 50,000 centipoise, especially at least 2,000,000 centipoise. Exemplary and preferred are organopolysiloxanes generally known as silicone raw rubbers.

Component (B) is an organopolysiloxane comprising $R_3^1SiO_{\frac{1}{2}}$ and $SiO_2$ units (MQ resin) for imparting adhesiveness after curing. $R^1$ is a monovalent hydrocarbon group having 1 to 12 carbon atoms or a hydroxyl group. The hydroxyl group, when used, is preferably in combination with a monovalent hydrocarbon group. Examples of the monovalent hydrocarbon group include alkyl groups such as methyl, ethyl and propyl, and alkenyl groups such as vinyl and allyl, with the methyl and vinyl groups being preferred. Most preferably, 95 mol % or more of the entire $R^1$ groups are methyl groups. The molar ratio of $R_3^1SiO_{\frac{1}{2}}$ unit to $SiO_2$ unit is in the range of from 0.5 to 1.2, preferably from 0.65 to 0.85. Adhesive force and tack are lost with a ratio of less than 0.5 whereas cohesive force is lost with a ratio of more than 1.2.

Component (B) is preferably blended in an amount of about 50 to 250 parts, especially about 100 to 200 parts by weight per 100 parts by weight of component (A). Less than 50 parts of component (B) on this basis would sometimes lead to a loss of adhesive and cohesive forces whereas more than 250 parts of component (B) would adversely affect tack.

Component (C) is an organohydrogenpolysiloxane containing at least two hydrogen atoms attached to silicon atoms in a molecule which serves as a crosslinking agent for organopolysiloxanes. Hydrogen atoms attached to silicon atoms give rise to hydrosilylation reaction with vinyl groups in component (A) and/or (E) for curing. Several examples of the organohydrogenpolysiloxane are given below.

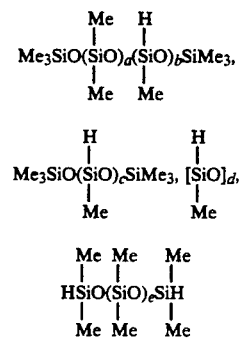

In the formulae, Me is methyl, letters a, b, c, and e are integers of at least 2, and d is an integer of at least 3.

Also useful are organohydrogenpolysiloxanes comprising a $HMe_2SiO_{\frac{1}{2}}$ unit and/or an $MeHSiO$ unit and further at least one unit selected from the group consisting of a $Me_3SiO_{\frac{1}{2}}$ unit, $Me_2SiO$ unit, $Ph_2SiO$ unit, $MeSiO_{3/2}$ unit, $PhSiO_{3/2}$ unit, and $SiO_2$ unit wherein Me is methyl and Ph is phenyl.

Component (C) or organohydrogenpolysiloxane is desirably added in such an amount that the ratio (H/Vi) of the total molar number (H) of hydrogen atoms of SiH groups in component (C) and the total molar number (Vi) of vinyl groups in components (A) and (E) ranges from 0.1 to 5, especially 0.3 to 2. A H/Vi ratio of less than 0.1 would result in a low crosslinking density and low cohesive force and leave the likelihood that the composition foams upon heating due to cracking of component (A) or organopolysiloxane. A H/Vi ratio of more than 5 would result in low tack and adhesive force and increase the risk of foaming by hydrogen gas.

Component (D) is a platinum catalyst for promoting addition reaction or hydrosilylation. The platinum catalyst may be selected from metallic platinum and platinum compounds. Examples include platinum black, chloroplatinic acid, alcohol-modified chloroplatinic acid, complexes of chloroplatinic acid with olefins, and complexes of chloroplatinic acid with vinylsiloxanes. The catalyst is added in a catalytic amount. The catalytic amount may vary in accordance with the desired curing rate although it generally ranges from about 10 to about 2000 parts, preferably from about 20 to about 1000 parts by weight of Pt per million parts by weight of the silicone self-adhesive composition of the invention. Less than 10 ppm of the catalyst would result in a low cross-linking density and cohesive force whereas more than 2,000 ppm of the catalyst would result in low tack, low adhesive force and a short pot life and is not economical.

Component (E) is an organopolysiloxane for preventing the organopolysiloxane (A) from cracking. It is a high vinyl content organopolysiloxane of the following general formula (3):

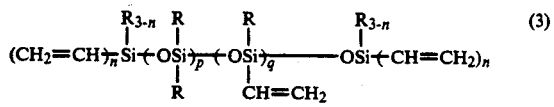

In formula (3), R is as defined for formulae (1) and (2). Methyl and phenyl groups are preferred as R from a commercial aspect. The siloxane chain is not particularly limited as long as p is an integer of from 0 to 1,000, q is an integer of from 10 to 1,000, and $0 \leq p/q \leq 1$. Preferably, organopolysiloxane (E) has a viscosity of about 50 to 150 centipoise at 25° C. A viscosity of lower than 50 centipoise would sometimes be insufficient to prevent cracking of component (A) whereas a viscosity of higher than 150 centipoise would sometimes adversely affect the adhesive force and tack of the composition. In formula (3) representing organopolysiloxane (E), p/q should be from 0 to 1, preferably from 0 to 0.5 because a p/q ratio of more than 1 leads to a low crosslinking density, allowing foaming by heat.

Component (E) is preferably blended in an amount of about 0.2 to about 10 parts, especially from about 1 to about 5 parts by weight per 100 parts by weight of component (A). Less than 0.2 parts of component (E) on this basis would be too small to prevent cracking of component (A). More than 10 parts of component (E) would require large amounts of component (C) which can increase the risk of foaming by hydrogen gas and lead to low adhesiveness.

For the purpose of extending the pot life, an addition reaction inhibitor may be blended in the silicone self-adhesive composition of the present invention. Examples of the inhibitor include alkynyl alcohols such as 3-methyl-1-butyn-3-ol, 3,5-dimethyl-1-hexyn-3-ol, 3-methyl-1-pentyn-3-ol, and phenylbutynol, and trimethylsilylated derivatives of these alcohols, 3-methyl-3-penten-1-ine and 3,5-dimethyl-3-hexen-1-ine. Additionally, additives which do not impede addition reaction, for example, antioxidants, pigments, stabilizers and fillers may be added.

The composition of the invention is generally used in a solventless system although it may be diluted with various organic solvents for the purposes of improving applicability and controlling coating thickness. Examples of the solvent include toluene, xylene, ethylbenzene, hexane, heptane, octane, mineral spirit, hexamethyldisiloxane, octamethylcyclotetrasiloxane, ethyl acetate, and methyl ethyl ketone alone or in admixture. Any other desired solvent is useful as long as it does not impede addition reaction.

The silicone self-adhesive composition of the invention is applied to various supports or substrates and cured thereon to form adhesive layers, thus offering adhesive products such as adhesive tapes and labels. The useful substrates include plastic films such as polyesters, polytetrafluoroethylene, polyimides, and polyether ether ketone, sheets of paper such as Japanese paper and synthetic paper, fabrics, glass wool, and metal foils. The composition is generally cured at a temperature of about 100° to about 150° C. for about 1 to about 3 minutes.

EXAMPLE

Examples of the present invention are given below by way of illustration and not by way of limitation. In the following Examples, all parts are by weight, Me is methyl, and Vi is vinyl.

EXAMPLE 1

A viscous solution was prepared by heating and agitating a mixture of 57 parts of a methylpolysiloxane consisting of $Me_3SiO_{\frac{1}{2}}$ and $SiO_2$ units in a molar ratio of 0.75:1.0, 43 parts of a dimethylsiloxane terminated with a dimethylvinylsiloxy group at either end (vinyl content 0.002 mol %, relative viscosity $\eta_r$ 2.8), and 167 parts of toluene at 110° C. for 3 hours, followed by cooling. Then 100 parts calculated as solids of the solution was mixed with 0.8 parts of a methylhydrogenpolysiloxane having the following average compositional formula (4), 1.0 part of a vinylmethylpolysiloxane having the following average compositional formula (5) (viscosity 100 cp at 25° C.), and 3.3 parts of a 0.5% isopropyl alcohol solution of chloroplatinic acid. SiH/SiVi=1.0. There was obtained a silicone self-adhesive composition having a non-volatile content of 60%.

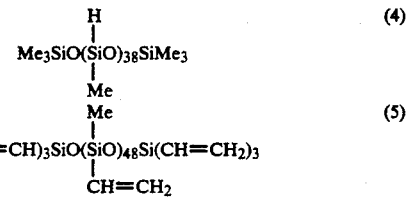

The composition was applied to a polyimide film of 50 μm thick and cured to a dry coating thickness of 30 μm by heating at 130° C. for one minute. There were obtained a polyimide support adhesive sheet and a polyimide support adhesive tape.

EXAMPLE 2

A silicone self-adhesive composition was prepared by the same procedure as Example 1 except that the dimethylpolysiloxane terminated with a dimethylvinylsiloxy group at either end was replaced by a dimethylpolysiloxane terminated with a hydroxy group at either end (relative viscosity $\eta_r$ 3.0). Similarly an adhesive sheet and tape were fabricated.

EXAMPLE 3

A viscous solution was prepared by heating and agitating a mixture of 60 parts of the methylpolysiloxane used in Example 1, 20 parts of the dimethylpolysiloxane terminated with a dimethylvinylsiloxy group at either end used in Example 2, 20 parts of the diemthylpolysiloxane terminated with a hydroxy group at either end used in Example 2, and 167 parts of toluene at 110° C. for 3 hours, followed by cooling. Then the procedure of Example 1 was followed, preparing a silicone self-adhesive composition and fabricating an adhesive sheet and tape.

COMPARATIVE EXAMPLE 1

A silicone self-adhesive composition was prepared by the same procedure as Example 1 except that the vinylmethylpolysiloxane of formula (5) was omitted. Similarly an adhesive sheet and tape were fabricated.

COMPARATIVE EXAMPLE 2

A silicone self-adhesive composition was prepared by mixing 100 parts of a commercially available vinyl-free silicone adhesive agent designated KR-101-10 (manufactured by Shin-Etsu Chemical Co., Ltd.), 50 parts of toluene, and 1.2 parts of benzoyl peroxide. As in Example 1, the composition was applied to a polyimide film and cured to a dry coating thickness of 30 μm by heating at 180° C. for 3 minutes. There were obtained a polyimide support adhesive sheet and a polyimide support adhesive tape.

These adhesive sheets and tapes were examined for tack, adhesive force, cohesive force and heat resistance by the following tests. The results are shown in Table 1.

TACK

An inclination ball tack test was carried out. The adhesive tape with its adhesive layer upward was placed on an inclined surface having an angle of 30°. A steel ball (SUJ2 as prescribed in JIS G-4805) at an approach distance of 10 cm was allowed to roll down the surface. The maximum diameter (in inch) of the ball that stopped within a distance of 10 cm over the adhesive layer was determined. The measuring conditions included a temperature of 25°±2° C. and a relative humidity of 65±5%.

ADHESIVE FORCE

The adhesive tape was pressure bonded to a stainless steel plate (SUS-304) by moving thereon a roller (metal roller having a weight of 2,000±50 g covered with a rubber layer of about 6 mm thick) back and forth at a speed of 300 mm/min. After the assembly was allowed to stand for one hour at 25°±2° C. and RH 65±5%, the adhesive tape was peeled off by means of an autograph (manufactured by Shimazu Mfg. K. K.) in a direction of 180° at a speed of 300 mm/min. for measuring the force required for peeling.

COHESIVE FORCE

The adhesive tape was bonded to a stainless steel plate (SUS-304) over an area of 25 mm×25 mm by the same roller-assisted method as used in the adhesive force measurement. With a load of 1 kg attached to the lower edge of the adhesive tape, the assembly was vertically suspended in an oven at 150° C. for 24 hours. The shift of the adhesive tape was measured under a reading microscope.

HEAT RESISTANCE

The silicone self-adhesive composition was applied to a Kapton film of 80 μm thick (manufactured by Toray K.K.) and cured to a dry thickness of 30 μm by heating. The resulting adhesive sheet was cut to a section of 50 mm×50 mm. The section was bonded to a stainless steel plate (SUS-304) using a 2-kg roller, allowed to stand at room temperature for one hour, heated in an oven at 260° C. for 576 hours or 300° C. for 2 hours for heat degradation, taken out of the oven, and cooled down to room temperature. The section was observed for appearance (foamed or not), separation, and shift and evaluated according to the following ratings.
A: No change from the initial (before aging)
B: Some changes
C: More than 50% changes.

TABLE 1

|  |  | E1 | E2 | E3 | CE1 | CE2 |
|---|---|---|---|---|---|---|
| Ball tack, inch | | 32 | 32 | 30 | 32 | 32 |
| Adhesive force, g/25 mm | | 1150 | 1250 | 1400 | 1300 | 1000 |
| Cohesive force, mm | | 0.10 | 0.50 | 0.30 | 1.50 | ≧25 |
| Heat resistance after aging | | | | | | |
| 260° C./576 hr. | Foaming | A | A | A | C | C |
|  | Peeling | A | A | A | B | B-C |
|  | Shift | A | A | A | B-C | B-C |
| 300° C./2 hr. | Foaming | A | A | A | C | C |
|  | Peeling | A | A | A | B | B |
|  | Shift | A | A | A | C | C |

As seen from Table 1, the silicone self-adhesive compositions having the high vinyl content polysiloxane of formula (5) are significantly improved in heat resistance as compared with a composition free of the high vinyl content polysiloxane (Comparative Example 1) and the commercially available composition (Comparative Example 2). The present compositions remain comparable in physical properties including tack, adhesive force, and cohesive force. The present compositions gain such properties through lower temperature, shorter curing than the commercially available composition.

There has been described a silicaone self-adhesive composition which can be briefly cured at relatively low temperatures to form an adhesive layer which exhibits improved bonding properties including tack, adhesive force and cohesive force and withstands temperatures of higher than 250° C. for a long time. The composition is thus suitable for use as heat resistant adhesive tapes and labels.

Although some preferred embodiments have been described, many modifications and variations may be made thereto in the light of the above teachings. It is therefore to be understood that within the scope of the appended claims, the invention may be practiced otherwise than as specifically described.

We claim:

1. A silicone self-adhesive composition comprising
(A) 100 parts by weight of at least one organopolysiloxane selected from the group consisting of organopolysiloxanes of the following general formula (1) and (2):

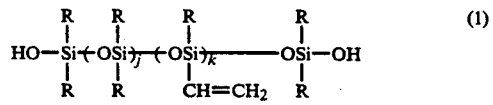

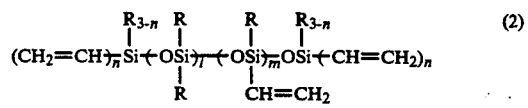

wherein R is a monovalent hydrocarbon group excluding alkenyl, letter n is an integer of from 0 to 3, k and m each are 0 or a positive integer, with the proviso that m is an integer of at least 2 when n is 0, and j and l each are an integer of at least 2,000,
(B) about 100 to 250 parts by weight of an organopolysiloxane comprising $R_3^1SiO_{\frac{1}{2}}$ and $SiO_2$ units wherein $R^1$ is a monovalenthydrocarbon gropu or a hydroxyl group, the molar ratio of $R_3^1SiO_{\frac{1}{2}}$ unit to $SiO_2$ unit being in the range of from 0.5 to 1.2, (C) an organohydrogenpolysiloxane containing at least two hydrogen atoms attached to silicon atoms in a molecule, in an amount such that the ratio of the total molar number of hydrogen atoms in component (C) and the total molar number of vinyl groups in components (A) and (E) is 0.1 to 5, (D) a catalytic amount of a platinum catalyst, and (E) an organopolysiloxane of the following general formula (3);

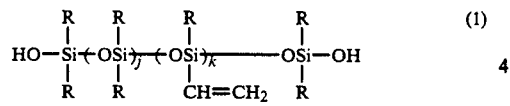

wherein R and n are as defined above, p is an integer of from 0 to 1,000, q is an integer of from 10 to 1,000, and $0 \leq p/q \leq 1$.

2. The composition of claim 1 which contains about 100 to about 200 parts of component (B).

3. The composition of claim 1 wherein component (C) is added such that the ratio of the total molar number of hydrogen atoms in component (C) and the total molar number of vinyl groups in components (A) and (E) ranges from 0.1 to 5.

4. The composition of claim 1 which contains 100 parts of component (A) and about 0.2 to about 10 parts of component (E).

5. The composition of claim 1, wherein 1-5 parts by weight of (E) per 100 parts by weight of (A) are used.

6. The composition of claim 1, wherein 1-4 parts by weight of (E) per 100 parts by weight of (A) are used.

7. A silicone self-adhesive composition comprising 100 parts by weight of at least one organopolysiloxane selected from the group consisting of organopolysiloxanes of the following general formulae (1) and (2);

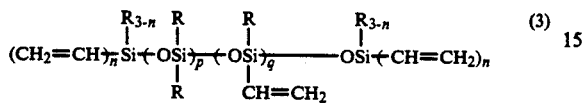

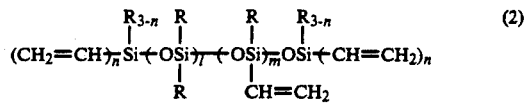

wherein R is a monovalent hydrocarbon group excluding alkenyl, letter n is an integer of from 0 to 3, k and m each are 0 or a positive integer, with the proviso that m is an integer of at least 2 when n is 0, and j and l each are an integer of at least 2,000, (B) an organopolysiloxane comprising $R_3^1SiO_{\frac{1}{2}}$ and $SiO_2$ units wherein $R^1$ is a monovalenthydrocarbon group or a hydroxyl group, the molar ratio of $R_3^1SiO_{\frac{1}{2}}$ unit to $SiO_2$ unit being in the range of from 0.5 to 1.2, (C) an organohydrogenpolysiloxane containing at least two hydrogen atoms attached to silicon atoms in a molecule, in an amount such that the ratio of the total molar number of hydrogen atoms in component (C) and the total molar number of vinyl groups in components (A) and (E) is 0.1 to 5, (D) a catalytic amount of a platinum catalyst, and (E) 1-5 parts by weight of an organopolysiloxane of the following general formula (3);

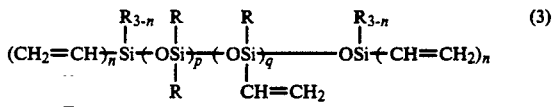

wherein R and n are as defined above, p is an integer of from 0 to 1,000, q is an integer of from 10 to 1,000, and $0 \leq p/q \leq 1$.

8. The composition of claim 7, wherein 100-250 parts by weight of (B) per 100 parts by weight of (A) are used.

9. The composition of claim 7, wherein 100-200 parts by weight of (B) per 100 parts by weight of (A) are used.

10. The composition of claim 7, wherein 1-4 parts by weight of (E) per 100 parts by weight of (A) are used.

11. The composition of claim 7, wherein 1-3 parts by weight of (E) per 100 parts by weight of (A) are used.

* * * * *